United States Patent Office 2,831,775
Patented Apr. 22, 1958

2,831,775

EDIBLE ANNATTO COLORING COMPOSITIONS AND METHOD OF PREPARING SAME

Richard Bruce Kocher, Madison, Wis.

No Drawing. Application November 13, 1956
Serial No. 621,496

11 Claims. (Cl. 99—148)

My invention is directed to a novel method of preparing new and improved edible annatto coloring compositions and to improved edible annatto compositions for use in coloring food products generally, including particularly dairy and related food products such as milk, cheese, butter, margarine and ice cream.

Annatto has been used as a coloring material in the food industry for a considerable number of years. It has usually been prepared in one of two general ways from the annatto seed, *bixa orellana*. One of such heretofore known procedures involves extracting the annatto seed with a vegetable oil and utilizing the vegetable oil solution of the annatto as a coloring composition. The other common procedure involves the extraction of the annatto seed with an aqueous alkaline solution.

The annatto coloring compositions prepared by either of the aforementioned known methods have a number of serious objections which the art has not succeeded adequately in overcoming. For example, vegetable oil solutions of annatto, while useful for the coloring of food products having a high fat content as, for example, butter, margarine and process cheese, are of no practical utility for the coloring of food products consisting mainly of an aqueous medium or in which the fat content is low, as, for instance, ordinary liquid milk. Thus, the addition of a vegetable oil solution of annatto to milk results in such solution floating on top of the milk, it being practically impossible or exceedingly difficult to effect uniform distribution of said solution through the milk. On the other hand, aqueous extracts of annatto, prepared by extracting the annatto seed with an aqueous alkaline solution, can be used, from a practical standpoint, only in the coloring of foods or solutions which are essentially aqueous in character or wherein the aqueous content is considerably greater than the fatty content. Such aqueous extracts of annatto are wholly unsatisfactory for the coloring of food products of a high fat content such as butter, margarine or process cheese. In an effort to meet the foregoing difficulties, it has heretofore been suggested to prepare compositions which comprise solutions of annatto in an oleaginous material, for example, a vegetable oil, and to which there is added an emulsifying agent in the form of a partial ester of a high fatty acid with a polyhydric alcohol. This approach, while offering certain advantages over previously known practices, nevertheless has a number of difficulties associated with it which have militated against its adoption by the art, at least to any material extent.

In the case of aqueous alkaline extracts of annatto, which represent the type of coloring composition which has heretofore commonly been used for the coloring of cheese, said extracts have another serious disadvantage in that they are relatively unstable. Thus, for example, after only relatively short periods of storage, an appreciable amount of sediment settles out, said sediment apparently comprising mainly annatto pigment which has undergone chemical change. The effect of such sedimentation is to render the annatto solution weaker in coloring strength. Exposure to low temperatures, such as sometimes occurs in shipment or storage, and particularly where freezing of the annatto solution occurs, accelerates the sedimentation action. This situation makes it necessary, therefore, to exercise precautionary measures to guard against freezing of the aqueous annatto solutions during either shipment or storage thereof in times of cold weather. The sedimentation appears to be caused, or accelerated, by reason of the presence in the aqueous extracts of the annatto seed of certain constituents, extraneous to the annatto pigment itself, which are extracted from the annatto seed together with the annatto in the aqueous alkaline extraction procedures described above.

I have discovered that the disadvantages of the heretofore known annatto compositions, such as have been mentioned above, can be overcome by extracting the annatto pigment from the annatto seed by means of propylene glycol (to wit, 1,2-propanediol which has the chemical formula $CH_3$—$CHOH$—$CH_2OH$) in the presence of an alkaline material which is, at least to some extent, soluble in the propylene glycol. The use of alkaline propylene glycol for the extraction of annatto seeds results in effective extraction of the desired annatto pigment and the avoidance of the extraction of other constituents of the annatto seed which apparently have heretofore been responsible for the aforementioned sedimentation or the acceleration thereof. Not only do the resulting annatto compositions possess outstanding color purity, but, as has been thoroughly demonstrated, said annatto compositions, even after months of storage at low temperatures, for instance, of the order of 0° F. and substantially therebelow, do not freeze nor do they exhibit any sedimentation.

The annatto compositions, to wit, alkaline propylene glycol solutions of annatto, produced in accordance with my invention have been demonstrated to possess important advantages over heretofore known annatto coloring compositions. In the first place, as has been pointed out above, they are markedly superior to previously known aqueous alkaline extracts of annatto seed with regard to the matter of stability against sedimentation. In the next place, they can be used highly effectively for coloring food products having either a high fat or a low fat content, or, for that matter, irrespective of the fat content or aqueous content of the food products. Thus, for instance, they have been found to be very satisfactory for coloring butter, natural cheese, process cheese, margarine and ice cream. Furthermore, since said alkaline propylene glycol solutions of annatto are soluble in water, they function nicely in processes of making natural cheese. In this latter case, for instance, they may be added to the liquid milk and mixed uniformly therethrough to effect coloration of the milk and, when the curd is precipitated from the milk to form the basis for the cheese, the annatto color is excellently retained by the curd. Again, it may be pointed out that the annatto coloring compositions of my invention mix much more readily into process cheese than do the heretofore known and commonly used aqueous annatto color compositions. Still further, because the extracted annatto pigment is highly pure, cheese colored with the compositions of my invention is less subject to the types of color defects which occasionally occur in cheese which is colored with conventional types of aqueous annatto extract.

In preparing the annatto compositions of my invention, the annatto seed, as indicated above, is extracted with propylene glycol in the presence of a small amount of an alkaline compound. Although the relative proportions, by weight, of the propylene glycol to the annatto seed are variable, in the usual case the annatto seed is mixed with at least twice its weight of propylene glycol and ordinarily from about 2 to 5 times its weight of propylene glycol although the proportions of the propylene glycol can, if desired, be materially greater. The alkaline compound is advantageously previously added to the propylene glycol and in such amounts as will produce a final annatto propylene glycol solution having an alkaline pH, particularly in the range of about 9.5 to 13.5 and, more especially, within the range of about 12 to 13. The alkaline compound employed may be any alkaline reacting substance which is at least partially soluble in the propylene glycol to produce a final solution of the desired alkalinity. Good results are obtained through the utilization of from about 1% to 5% of potassium hydroxide, based on the weight of the propylene glycol, or other alkalies can be used which will produce an equivalent alkalinity. The alkali metal hydroxides, particularly potassium hydroxide and sodium hydroxide, are preferred although other alkaline compounds can be used.

In carrying out the extraction, the mixtures of the annatto seeds and the alkaline propylene glycol is heated to increase the speed of the extraction. I prefer to use elevated temperatures, generally of the order of 190 to 230 degrees F., with a temperature of about 215 to 225 degrees F. being preferred. The length of time of extraction is variable depending, among other things, upon the bulk of the annatto seeds being extracted. There is nothing critical about either the time or the temperature. After the extraction operation has been completed, the seeds are strained off and the resulting liquid extract is then filtered. Before filtering, it is preferred to cool the liquid extract down to about 140 to 170 degrees F. and then filter. To obtain good clarity in the finished product, I prefer, also, to add a filter aid to the liquid extract before filtering. Various conventional filter aids can be employed as, for example, diatomaceous earth, infusorial earth, ground asbestos, paper pulp and the like. The quantity of filter aid is variable but, in general, the amount is small, being usually in the range of about 1% to 5%, by weight, of the liquid extract to be filtered.

The following examples are illustrative of the manner in which the annatto compositions of my invention are prepared. It will be understood that such examples are in no way limitative of the invention since various changes may be made therein with reference to temperatures, selection of alkaline materials, proportions of ingredients and the like. All parts listed are by weight.

*Example 1*

One part of annatto seed is mixed with four parts of propylene glycol to which was previously added 3%, by weight of the propylene glycol, of potassium hydroxide. The mixture is heated to about 220 degrees F., with agitation. The seeds are strained off and the resulting liquid extract is cooled to about 160 degrees F., mixed with about 2% of its weight of a filter aid, and then filtered. The final liquid extract may be standardized to a desired color strength and is then ready for use.

The seeds may be extracted with further and additional aliquots of the aforesaid alkaline propylene glycol, and treated as aforesaid, until all of the color has been removed from said seeds.

*Example 2*

One part of annatto seed is mixed with 5 parts of propylene glycol to which 5%, by weight of the propylene glycol, of potassium hydroxide was previously added. The mixture is heated within the range of 190 to 230 degrees F., with agitation. The seeds are then strained off, the liquid extract is advantageously cooled to about 160 degrees F., mixed with about 3% of its weight of filter aid, and filtered. The resulting liquid extract is standardized to the desired color strength.

I claim as my invention:

1. A method of preparing a new and improved edible solution of annatto, useful for the coloring of either high or low fat content dairy and other food products, which comprises extracting annatto seed with alkaline propylene glycol, heating said mixture, under agitation, to an elevated temperature, and separating the resulting liquid from the extracted seed.

2. A method of preparing a new and improved edible solution of annatto, useful for the coloring of either high or low fat content dairy and other food products, which comprises extracting annatto seed with at least about twice its weight of propylene glycol in the presence of an alkali at least partially soluble in said propylene glycol, heating said mixture, under agitation, to an elevated temperature, and separating the resulting liquid from the extracted seed.

3. A method of preparing a new and improved edible solution of annatto, useful for the coloring of either high or low fat content dairy and other food products, which comprises extracting annatto seed with from about 2 to 5 times its weight of propylene glycol in the presence of about 1% to 5%, by weight of said propylene glycol, of an alkali metal hydroxide, heating said mixture, under agitation, to an elevated temperature not substantially in excess of 230 degrees F., separating the resulting liquid from the extracted seed, mixing said liquid with a filter aid, and then filtering whereby to obtain said solution of annatto.

4. A method of preparing a new and improved edible solution of annatto, useful for the coloring of either high or low fat content dairy and other food products, which comprises extracting annatto seed with from about 2 to 5 times its weight of propylene glycol to which potassium hydroxide in proportions of about 1% to 5%, by weight of said propylene glycol, has been added, heating said mixture, under agitation, to a temperature between about 200 and 230 degrees F., separating the resulting liquid from the extracted seed, mixing said liquid with a filter aid, and then filtering whereby to obtain said soltuion of annatto.

5. A method of preparing a new and improved edible solution of annatto, useful for the coloring of either high or low fat content dairy and other food products, which comprises extracting annatto seed with at least twice its weight of propylene glycol to which an alkaline reacting material at least partially soluble therein has been added in amounts sufficient to produce a pH in the recovered solution of annatto within the range of about 9.5 to 13.5, heating said mixture, under agitation, to an elevated temperature, and separating the resulting liquid from the extracted seed.

6. A method of preparing a new and improved edible solution of annatto, useful for the coloring of either high or low fat content dairy and other food products, which comprises extracting annatto seed with from about 2 to 5 times its weight of propylene glycol to which from about 1% to 5%, by weight of said propylene glycol, of potassium hydroxide has been added, whereby to produce a pH in the recovered solution of annatto within the range of about 9.5 to 13.5, heating said mixture, under agitation, to an elevated temperature not substantially in excess of 230 degrees F., separating the resulting liquid from the extracted seed, mixing said liquid with a filter aid, and then filtering whereby to obtain said solution of annatto.

7. A new and improved edible solution of annatto, useful for the coloring of either high or low fat content dairy and other food products, said solution comprising an alkaline propylene glycol solution of annatto, said solution being substantially free from the tendency of sedimentation even at low temperatures over prolonged periods of storage.

8. A new and improved edible solution of annatto, useful for the coloring of either high or low fat content dairy and other food products, said solution comprising an alkaline propylene glycol solution of annatto, said solution having a pH within the range of about 9.5 to 13.5 and being substantially free from the tendency of sedimentation even at low temperatures over prolonged periods of storage.

9. A new and improved edible solution of annatto, useful for the coloring of either high or low fat content dairy and other food products, said solution comprising an alkaline propylene glycol extract of annatto seed, said solution having a pH within the range of about 12 to 13 and being substantially free from the tendency of sedimentation even at low temperatures over prolonged periods of storage.

10. A new and improved edible solution of annatto, useful for the coloring of either high or low fat content dairy and other food products, said solution comprising an extract of annatto seed with propylene glycol containing from about 1% to 5%, by weight, of potassium hydroxide, said solution having a pH within the range of about 9.5 to 13.5 and being substantially free from the tendency of sedimentation even at low temperatures over prolonged periods of storage.

11. A new and improved edible extract of annatto, useful for coloring food products, said extract comprising a solution of the coloring pigment of annatto in alkaline propylene glycol, and being substantially free from sedimentation.

References Cited in the file of this patent
UNITED STATES PATENTS

| | | |
|---|---|---|
| 43,034 | MacPhail | June 7, 1864 |
| 1,384,681 | Smith et al. | July 12, 1921 |
| 2,236,517 | Cahn et al. | Apr. 1, 1941 |
| 2,546,748 | Herlow | Mar. 27, 1951 |